US012583676B2

(12) United States Patent
Ikeuchi et al.

(10) Patent No.: US 12,583,676 B2
(45) Date of Patent: Mar. 24, 2026

(54) MOBILE BODY CONTROL SYSTEM, MOBILE BODY CONTROL METHOD, AND STORAGE MEDIUM

(71) Applicant: TOYOTA JIDOSHA KABUSHIKI KAISHA, Toyota (JP)

(72) Inventors: Yoshito Ikeuchi, Setagaya-ku (JP); Shiro Oda, Anjo (JP); Takeshi Matsui, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 466 days.

(21) Appl. No.: 18/127,709

(22) Filed: Mar. 29, 2023

(65) Prior Publication Data

US 2023/0382643 A1     Nov. 30, 2023

(30) Foreign Application Priority Data

May 31, 2022     (JP) ................................. 2022-088562

(51) Int. Cl.
*B65G 1/06*             (2006.01)
(52) U.S. Cl.
CPC ................................... *B65G 1/065* (2013.01)
(58) Field of Classification Search
CPC .............. B65G 1/065; B66B 2201/215; B66B 2201/222; B66B 2201/223; B66B 1/2408; G05B 19/0423; G05B 2219/25257
See application file for complete search history.

(56) References Cited

U.S. PATENT DOCUMENTS

2019/0315592 A1     10/2019   Machida et al.

FOREIGN PATENT DOCUMENTS

| CN | 109789998 B | * | 6/2021 | .......... | B66B 1/3461 |
| JP | H06-234469 A | | 8/1994 | | |
| JP | 2017-220121 A | | 12/2017 | | |
| JP | 6350767 B1 | | 7/2018 | | |
| KR | 20210063121 A | * | 6/2021 | .......... | B25J 19/023 |
| WO | 2018/066056 A1 | | 4/2018 | | |

* cited by examiner

*Primary Examiner* — Jacob S. Scott
*Assistant Examiner* — Miraj T. Patel
(74) *Attorney, Agent, or Firm* — Dinsmore & Shohl LLP

(57)               ABSTRACT

The mobile body control system includes: an acquisition unit that acquires information on the entry source and information on the destination of the first and second mobile bodies that enter the elevator car; and a determination unit that determines whether or not the first and second mobile bodies pass each other based on the information on the entry source and the information on the destination of the mobile body. When the determination unit determines that the passing of the first and second mobile bodies occurs, at least one of the first and second mobile bodies changes the operation plan.

5 Claims, 7 Drawing Sheets

(NUMBER OF STORIES)

(NUMBER OF STORIES)

(NUMBER OF STORIES)

(NUMBER OF STORIES)

(NUMBER OF STORIES)

(NUMBER OF STORIES)

MOBILE BODY CONTROL SYSTEM, MOBILE BODY CONTROL METHOD, AND STORAGE MEDIUM

CROSS-REFERENCE TO RELATED APPLICATION

This application claims priority to Japanese Patent Application No. 2022-088562 filed on May 31, 2022, incorporated herein by reference in its entirety.

BACKGROUND

1. Technical Field

The present disclosure relates to a mobile body control system, a mobile body control method, and a storage medium.

2. Description of Related Art

Japanese Patent No. 6350767 (JP 6350767 B) describes a control device for an elevator used by a user and an autonomous mobile body. autonomous mobile objects The control device of the elevator described in JP 6350767 B controls a plurality of autonomous mobile bodies to not enter the elevator at the same time.

SUMMARY

The control device of the elevator described in JP 6350767 B controls the mobile body so that the mobile body does not enter the elevator even in a case where there is no problem with the mobile body riding with another mobile body in the elevator. Therefore, in the elevator control device described in JP 6350767, there is a problem that an operation plan of the mobile body cannot be sufficiently facilitated.

The present disclosure has been made to solve such a problem, and an object thereof is to provide a mobile body control system, a mobile body control method, and a storage medium capable of facilitating an operation of an autonomous mobile body.

A mobile body control system according to a first aspect of the present disclosure includes:

an acquisition unit that acquires information on an entry source and information on a destination of a first mobile body and a second mobile body entering an elevator car; and a determination unit that determines whether the first mobile body and the second mobile body pass each other, based on the information on the entry source and the information on the destination of the mobile bodies.

When the determination unit determines that the first mobile body and the second mobile body pass each other, at least one of the first mobile body and the second mobile body changes an operation plan.

According to such a configuration, it is possible to suppress the autonomous mobile bodies from passing each other. As a result, the autonomous mobile bodies can be operated smoothly.

In the mobile body control system according to the first aspect, when the determination unit determines that the first mobile body and the second mobile body pass each other, at least one of the mobile bodies determined to pass each other may wait for entering the elevator car.

In the mobile body control system according to the first aspect, when the determination unit determines that the first mobile body and the second mobile body pass each other, at least one of the mobile bodies determined to pass each other may cancel entering the elevator car.

In the mobile body control system according to the first aspect, the information on the entry source may include information indicating the floor number of floor of the entry source, and the information on the destination may include information indicating a floor number of the destination.

In the mobile body control system according to the first aspect, the elevator car may include a plurality of doors, the information on the entry source may include information indicating the floor number of floor of the entry source and identification information of an entry door, and the information on the destination may include information indicating a floor number of the destination and identification information of an exit door.

In the mobile body control system according to the first aspect, when the determination unit determines whether the first mobile body entering from a first door and exiting from a second door and the second mobile body entering from only one of the first and the second doors pass each other, the determination unit may determine whether a first graph on xy coordinates represented by Equation 1 below and a second graph on xy coordinates represented by Equation 2 below have an intersection point, and when the first graph and the second graph have the intersection point, the determination unit may determine that the first mobile body and the second mobile body pass, Equation 1

$$y = \frac{m_2 - m_1}{b - a}x + \frac{bm_1 - am_2}{b - a} \qquad \text{Equation 1}$$

Equation 2

$$y = k(x - c)(x - d) + m \qquad \text{Equation 2}$$

in which, a is a floor number of an entry source of the first mobile body, b is a floor number of a destination of the first mobile body, c is a floor number of an entry source of the second mobile body, d is a floor number of a destination of the second mobile body, $m_1$ and $m_2$ are different real numbers, when the second mobile body enters and exits from the first door, m is $m_1$, when the second mobile body enters and exits from the second door, m is $m_2$, when m is the larger one of $m_1$ and $m_2$, k is a positive real number, when m is the smaller one of $m_1$ and $m_2$, k is a negative real number, k satisfies the following Equation 3, Equation 3

$$|k(c - d)| < \frac{|m_2 - m_1|}{f - 1} \qquad \text{Equation 3}$$

f is the total number of floors that the elevator car can move.

A mobile body control method according to a second aspect of the present disclosure includes:

acquiring information on an entry source and information on a destination of first and second mobile bodies entering an elevator car;

determining whether the first mobile body and the second mobile body pass each other, based on the information on the entry source and the information on the destination of the mobile bodies; and changing an operation plan of at least one of the first mobile body and the second mobile body when the first mobile body and the second mobile body are determined to pass each other.

A storage medium according to a third aspect of the present disclosure is a storage medium storing instructions that are executable by one or more processors and that cause the one or more processors to execute functions below. The instructions include:

acquiring information on an entry source and information on a destination of first and second mobile bodies entering an elevator car;

determining whether the first mobile body and the second mobile body pass each other, based on the information on the entry source and the information on the destination of the mobile bodies; and changing an operation plan of at least one of the first mobile body and the second mobile body when the first mobile body and the second mobile body are determined to pass each other.

According to the present disclosure, it is possible to provide a mobile body control system, a mobile body control method, and a storage medium capable of facilitating an operation of an autonomous mobile body.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Configuration of Mobile Body Control System

Figure 1:
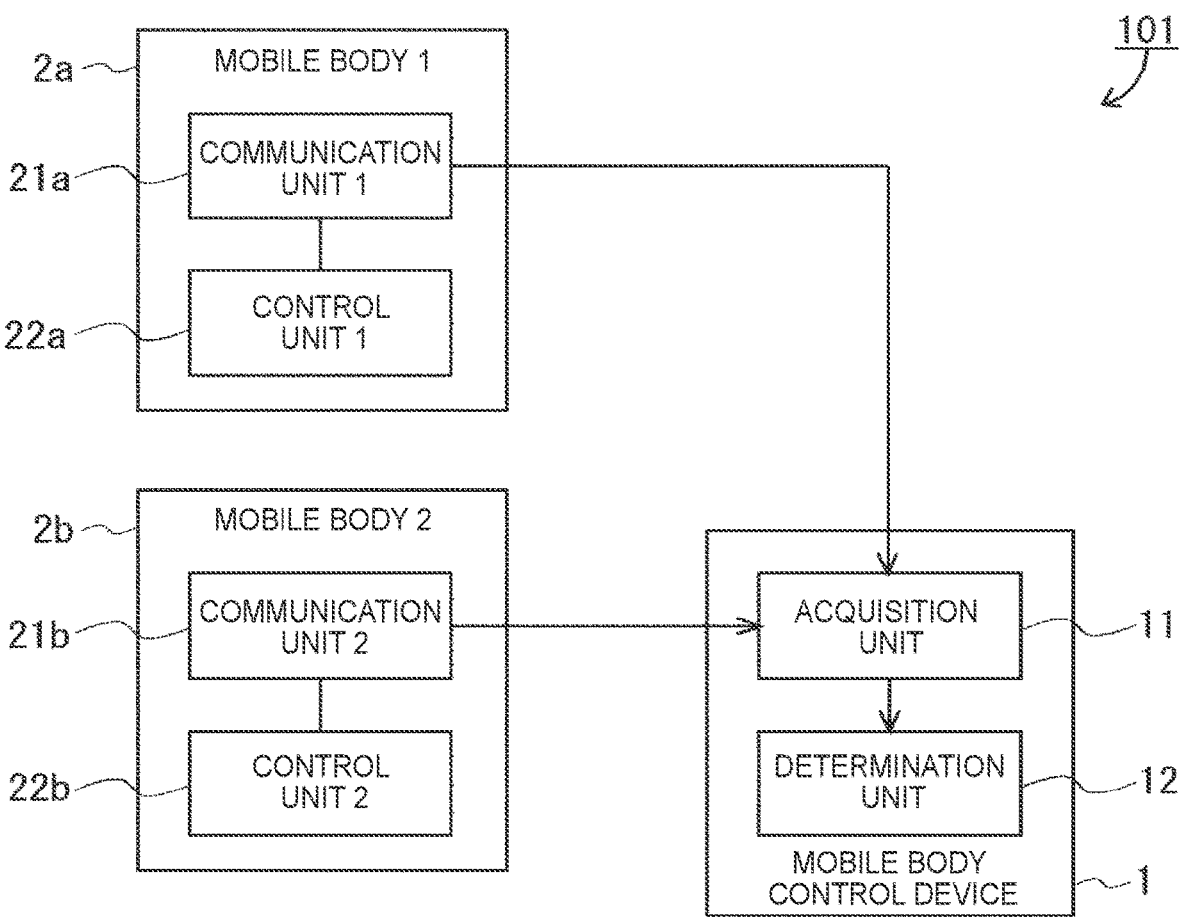
FIG. 1 is a block diagram illustrating a configuration of a mobile body control system according to a first embodiment.

Hereinafter, a first embodiment according to the present disclosure will be described in detail with reference to the drawings. First, the configuration of the mobile body control system according to the present embodiment will be described in detail. FIG. 1 is a block diagram for explaining a configuration of a mobile body control system according to a first embodiment.

The mobile body control system 101 according to the present embodiment includes a mobile body control device 1, a mobile body 2a, and a mobile body 2b.

In the mobile body control system 101 according to the present embodiment, the mobile body control device 1 controls the mobile body 2a and the mobile body 2b. More specifically, the mobile body control device 1 controls the operation planning of the mobile body 2a and the mobile body 2b so that a passing of the mobile body 2a and the mobile body 2b does not occur in the elevator.

In the following description, the mobile body 2a and the mobile body 2b are simply referred to as a mobile body 2 unless otherwise required to be distinguished.

Further, although the mobile body control system according to the present embodiment includes two mobile bodies 2, the number of mobile bodies 2 that can be controlled by the mobile body control system 101 according to the present disclosure is not limited to two. For example, the mobile body control system 101 according to the present disclosure may control three or more mobile bodies 2.

Figure 2:
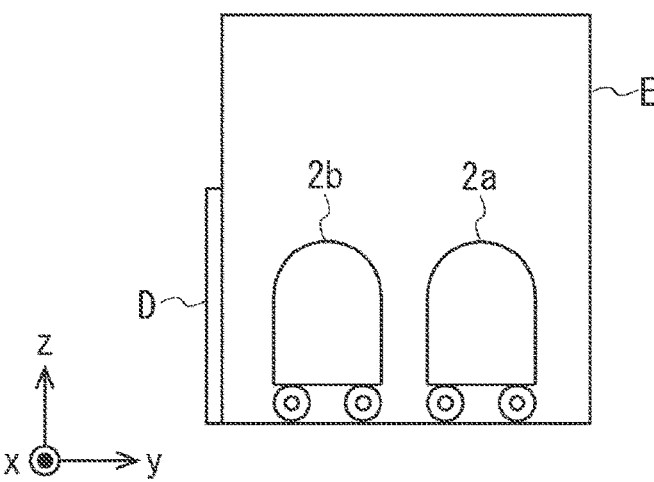
FIG. 2 is a schematic diagram illustrating a configuration of a mobile body according to the first embodiment.
Figure 3:
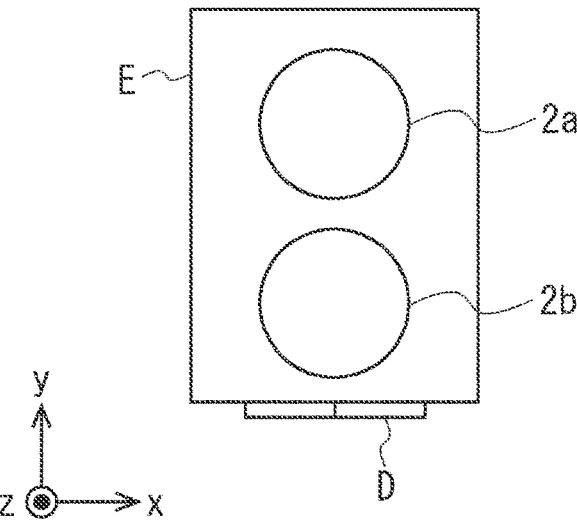
FIG. 3 is a schematic diagram illustrating a configuration of a mobile body according to the first embodiment.

Hereinafter, the mobile body 2 will be described with reference to FIGS. 2 and 3. FIG. 2 and FIG. 3 are schematic diagrams for explaining a configuration of a mobile body according to the first embodiment. More specifically, FIG. 2 is a schematic side view of a mobile body 2a and a mobile body 2b riding on an elevator. FIG. 3 is a schematic plan view of a mobile body 2a and a mobile body 2b on an elevator.

It should be understood that the right-hand xyz normal coordinates illustrated in FIG. 2 and the remaining drawings are for convenience of describing the positional relation of the constituent elements. Usually, the positive direction of the z-axis is vertically upward and xy plane is a horizontal plane, which is the same among the drawings.

The mobile body 2 according to the present embodiment rides on an elevator car E having one door D. As shown in FIGS. 2 and 3, when two mobile bodies 2 are boarding in the elevator car E, two mobile bodies 2 are boarding in the depth direction of the elevator car E, that is, in the y-axis direction.

When two mobile bodies 2 are boarding in the elevator car E, the mobile body 2 that has boarded earlier boards on the back side as viewed from the door D, and the mobile body 2 that has boarded later boards on the front side as viewed from the door D. In FIGS. 2 and 3, the mobile body 2a is on the back side as viewed from the door D, and is on the front side as viewed from the mobile body 2b door D.

In FIGS. 2 and 3, when the mobile body 2a descends from the elevator car E before the mobile body 2b, the mobile body 2a needs to reach the door D while avoiding the mobile body 2b. In the present disclosure, such a situation, that is, a situation in which another mobile body 2 exists on a path toward the door D when the mobile body 2 descends from the door D, is referred to as a situation in which a pass occurs.

As described above, in a situation where a pass occurs, the mobile body 2a needs to avoid mobile body 2b. Therefore, when the elevator car E is not sufficiently wide, the mobile body 2a cannot get off the elevator. In addition, even in a case where the elevator car E is sufficiently wide, when the avoidance action is performed in the elevator, it takes time and the smooth operation cannot be performed.

Therefore, the mobile body control system 101 according to the present embodiment controls the mobile body 2 so as to avoid a situation in which a pass occurs.

The mobile body 2 transmits information on the entry source and information on the destination to the mobile body control device 1. Then, the mobile body 2 receives, from mobile body control device 1, a determination result as to whether or not a pass-through occurs.

However, the information regarding the entry source according to the present embodiment is information indicating the number of floors of the floor where the mobile body 2 enters the elevator car E. Further, the information regarding the destination according to the present embodiment is information indicating the number of floors of the floor on which the mobile body 2 gets off from the elevator car E.

When the mobile body 2 receives the determination result that the passing occurs, at least one of the mobile bodies 2 determined to cause the passing changes the operation plan. In addition, when the determination result that the pass-through does not occur is received, the mobile body 2 rides on the elevator car E without changing the operation plan. Here, the operation plan is a plan for defining a moving path of the mobile body 2.

The operation plan according to the present embodiment includes a plan regarding whether to use the elevator car E, whether to get on or off the elevator car E on any floor, or whether to wait for an entrance to the elevator car E. That is, the operation plan according to the present embodiment includes information on the entry source and information on the destination.

The description of FIG. 1 is returned.

The mobile body 2a according to the present embodiment includes a communication unit 21a and a control unit 22a. Further, the mobile body 2b according to the present embodiment includes a communication unit 21b and a control unit 22b.

In the following description, the communication unit 21a and the communication unit 21b are simply referred to as the communication unit 21 unless they need to be distinguished. Hereinafter, the control unit 22a and the control unit 22b are simply referred to as a control unit 22 unless otherwise required to be distinguished.

The communication unit 21 communicates with the mobile body control device 1. More specifically, the communication unit 21 acquires, from the control unit 22, information on the entry source and information on the destination. Then, the communication unit 21 transmits the information acquired from the control unit 22 to the mobile body control device 1.

Further, the communication unit 21 receives, from the mobile body control device 1, a determination as to whether or not a pass occurs in the mobile body 2a and the mobile body 2b. The communication unit 21 outputs the received determination result to the control unit 22.

The control unit 22 controls the operation of the mobile body 2. The control unit 22 stores an operation plan and moves the mobile body 2 in accordance with the operation plan.

The control unit 22 outputs, to the communication unit 21, information on the entry source and information on the destination. In addition, the control unit 22 acquires, from the communication unit 21, a determination as to whether or not a passing occurs in the mobile body 2a and the mobile body 2b.

The control unit 22 changes the operation plan when the communication unit 21 acquires the determination that the mobile body 2a and the mobile body 2b have passed each other.

For example, the control unit 22 may change the operation plan so as to wait for the entrance to the elevator car E. In addition, the control unit 22 may change the operation plan so as to stop the entrance to the elevator car E.

Note that only one of the mobile body 2a and the mobile body 2b may change the operation plan, or both the mobile body 2a and the mobile body 2b may change the operation plan.

When only one of the mobile body 2a and the mobile body 2b changes the operation plan, for example, priority may be given between the mobile body 2a and the mobile body 2b, and the operation plan of the mobile body 2 with the lower priority may be changed.

The control unit 22 includes an arithmetic unit such as a Central Processing Unit (CPU (not shown), and a storage unit such as a Random Access Memory (RAM) and a Read Only Memory (ROM for controlling the mobile body 2. That is, the control unit 22 has a function as a computer, and controls the mobile body 2 based on the program. Note that CPU in the present disclosure is an example of a processor.

The mobile body control device 1 acquires information on the entry source and information on the destination from the mobile body 2. Based on the acquired data, it is determined whether or not a pass occurs in the mobile body 2a and the mobile body 2b.

It should be noted that the mobile body control device 1 according to the present embodiment determines whether or not a passing of the mobile body 2 occurs every time the elevator car E is folded back. In other words, the mobile body control device 1 according to the present embodiment determines whether or not the mobile body 2 has passed each time the mobile body is raised or lowered.

The mobile body control device 1 may be configured as, for example, a server device capable of communicating with the mobile body 2. Further, the mobile body control device 1 may be an elevator control device that controls the movement of the elevator car E.

The acquisition unit 11 acquires information on a boarding source and information on a destination of the first and second mobile bodies that get into the elevator car E. The acquisition unit 11 may be configured as, for example, a communication device that communicates with the mobile body 2.

The acquisition unit 11 outputs the acquired information to the determination unit 12.

The determination unit 12 acquires, from the acquisition unit 11, information on the entry source of the mobile body 2 and information on the destination. Then, the determination unit 12 determines whether or not the first and second mobile bodies have passed each other based on the information acquired from the acquisition unit 11.

The determination unit 12 transmits the determined result to the mobile body 2. When the acquisition unit 11 is configured as a communication device, the determination unit 12 may transmit the determined result to the mobile body 2 via the acquisition unit 11.

The mobile body control device 1 includes, for example, an arithmetic unit such as a CPU (not shown) and a storage unit such as a RAM, ROM in which programs, data, and the like for controlling the mobile body control device 1 are stored. That is, the mobile body control device 1 has a function as a computer, and executes the above-described operations based on the above-described program.

It should be noted that the program includes instructions (or software code) for causing a computer to perform one or more of the functions described in the embodiments when loaded into the computer. The program may be stored in a non-transitory computer-readable medium or a tangible storage medium. By way of example, a computer-readable medium or tangible storage medium includes random-access memory (RAM), read-only memory (ROM), flash memory, solid-state drive (SSD) or other memory techniques, CD-ROM, digital versatile disc (DVD), Blu-ray disk or other optical disk storage, magnetic cassettes, magnetic tape, magnetic disk storage or other magnetic storage devices. The program may be transmitted on a transitory computer-readable medium or a communication medium. The example of the transitory computer-readable medium or the communication medium includes, but is not limited to, an electrical, optical, acoustic, or other form of propagating signal.

Judgment Method

Next, a method of determining whether or not the first and second mobile bodies are passed will be described in detail with reference to the drawings.

For example, the determination unit 12 according to the present embodiment determines whether or not the first graph on xy coordinates represented by Equation 4 below and the second graph on xy coordinates represented by Equation 5 below have an intersection with y>0. Then, when the first and second graphs have intersections in a range of y>0, it may be determined that the first and second mobile bodies pass each other.

Mathematical Formula 4)

$$y = k(x-a)(x-b) \qquad \text{Equation 4}$$

Mathematical Formula 5)

$$y = k(x-c)(x-d) \qquad \text{Equation 5}$$

However,

A is the number of floors from which the mobile body 2a enters, b is the rank of the destination of the mobile body 2a, c is the number of floors from which the mobile body 2b is loaded, d is the rank of the destination of the mobile body 2b, k is a negative real number.

As described above, in the present embodiment, it is determined whether or not a passing of the mobile body 2 occurs every time the elevator car E is raised or lowered. Therefore, when the elevator car E descends, a>b and c>d are satisfied. On the other hand, when the elevator car E is raised, a<b and c<d are satisfied.

Figure 4:
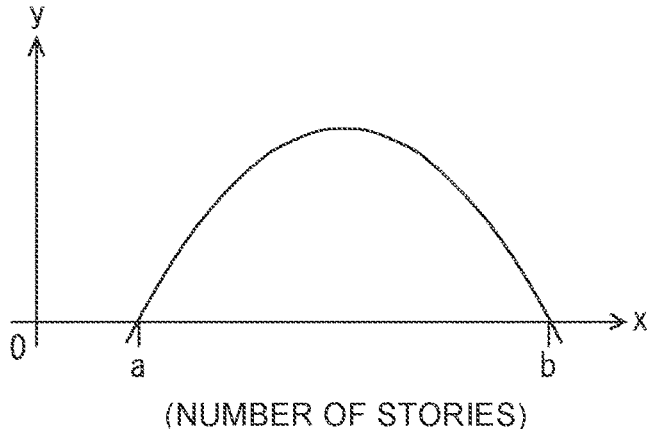
FIG. 4 is a diagram showing a graph on an xy coordinate represented by Equation 4.

FIG. 4 is a diagram illustrating a first plot of xy coordinates represented by Equation 4. The graph represented by Equation 4 is represented as a graph of an upwardly convex quadratic function passing through points (a, 0) and (b, 0) on the x-axis as shown in FIG. 4.

In FIG. 4, a case where the elevator car E is raised is shown, and a<b is shown, but when the elevator car E is lowered, a>b is shown.

The graph represented by Equation 5 is also represented as a graph of an upwardly convex quadratic function passing through points (c, 0) and (d, 0) on the x-axis.

Here, when the elevator car E is raised, a<c<b<d is satisfied, and when the elevator car E is lowered, a>c>b>d is satisfied to cause the mobile body 2a and the mobile body 2b to pass through. When these conditions are satisfied, the first and second graphs each have an intersection in the range of y>0.

Also, in cases other than these magnitude relationships, the first and second graphs do not have intersections in the range of y>0.

Therefore, when it is determined whether or not these charts have an intersection point in a range of y>0, the determination unit 12 can determine whether or not the mobile body 2a and the mobile body 2b are crossed.

Operation of the Mobile Body Control System

Next, the operation of the mobile body control system 101, that is, the mobile body control method according to the first embodiment will be described in detail.

Figure 5:
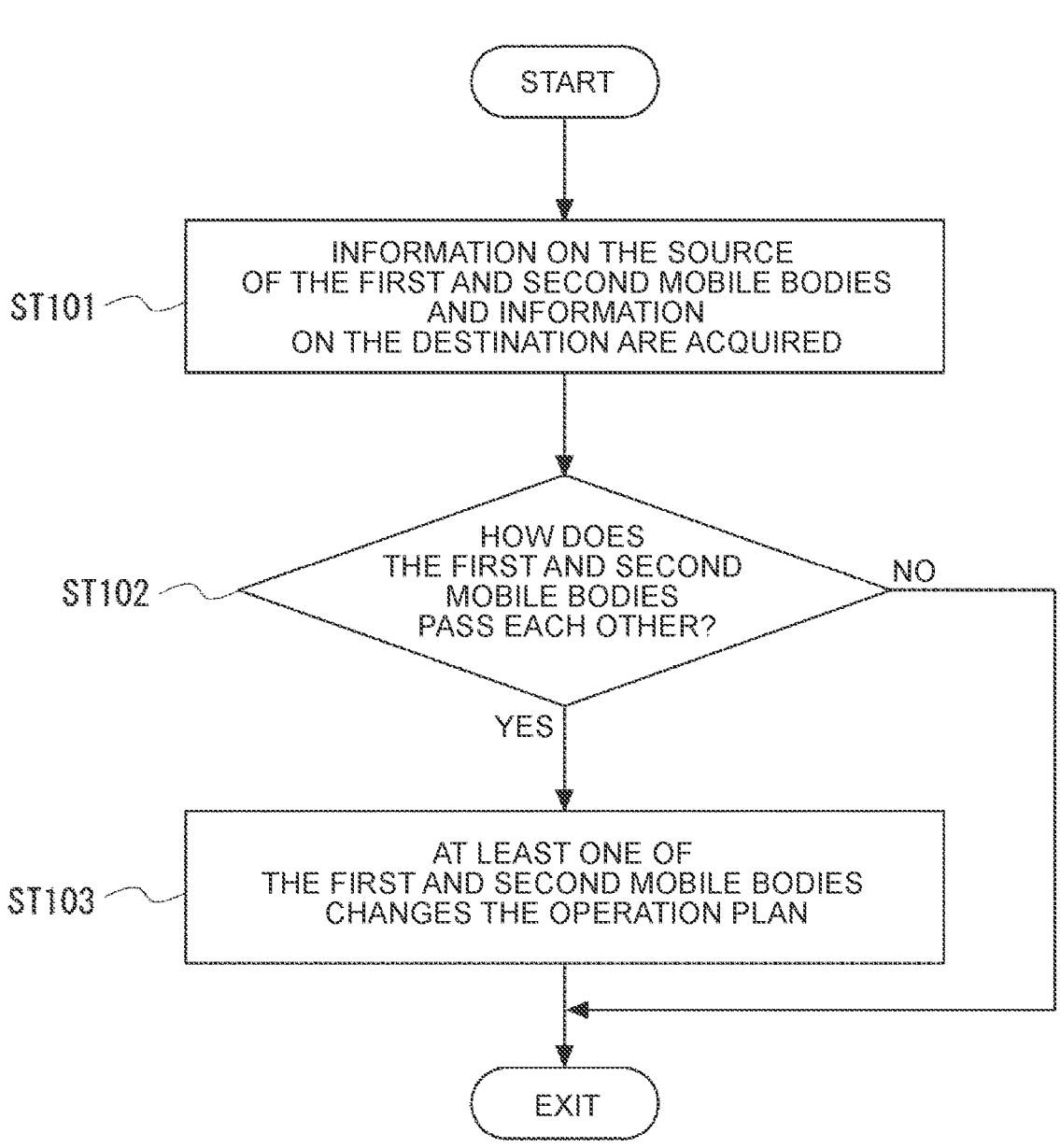
FIG. 5 is a flowchart illustrating an operation of the mobile body control system according to the first embodiment.

FIG. 5 is a flowchart for explaining an operation of the mobile body control system according to the first embodiment.

First, the acquisition unit 11 acquires information on the entry source and information on the destination of the first and second mobile bodies (step ST101).

More specifically, the acquisition unit 11 acquires, from the mobile body 2, information on a ride-in source and information on a destination. Then, the acquisition unit 11 outputs, to the determination unit 12, the information on the entry source and the information on the destination.

Next, the determination unit 12 determines whether or not the first and second mobile bodies have passed each other (step ST102).

More specifically, the determination unit 12 determines whether or not the first graph on xy coordinates represented by Equation 4 and the second graph on xy coordinates represented by Equation 5 have an intersection with y>0. Then, when the first graph and the second graph have intersection points in a range of y>0, it is determined that the first and second mobile bodies have the crossing points.

When it is determined that the first and second mobile bodies have passed each other (step ST102 YES), at least one of the first and second mobile bodies changes the operation plan (step ST103), and the mobile body control system 101 ends the series of operations.

When it is determined that the first and second mobile bodies do not pass each other (ST102 NO in steps), the mobile body control system 101 ends the series of operations. That is, the mobile body control system 101 ends the series of operations without changing any of the operation plans among the first and second mobile bodies.

The mobile body control system 101 according to the present embodiment executes a series of operations illustrated in the flowchart of FIG. 5 at every ascent or descent.

As described above, the mobile body control system 101 according to the present embodiment determines whether or not a passing of the mobile body occurs in the elevator car based on the information on the entry source and the information on the destination of the first and second mobile bodies that enter the elevator car.

Then, when it is determined that the traveling of the mobile body occurs in the elevator car, at least one of the first and second mobile bodies changes the operation plan.

According to such a configuration, the mobile body control system 101 can suppress the occurrence of the passing of the mobile body in the elevator car. As a result, the operation of the autonomous vehicle can be facilitated.

Second Embodiment

Configuration of Mobile Body Control System

Hereinafter, a first embodiment according to the present disclosure will be described in detail with reference to the drawings. First, the configuration of the mobile body control system according to the present embodiment will be described in detail.

The mobile body control system according to the second embodiment is an application example of the mobile body control system according to the first embodiment. Therefore, the mobile body control system according to the present embodiment has the same configuration as that of the mobile body control system 101 shown in FIG. 1.

The mobile body control system according to the second embodiment is different from the first embodiment in that the mobile body 2 rides on an elevator car having a plurality of doors.

Figure 6:
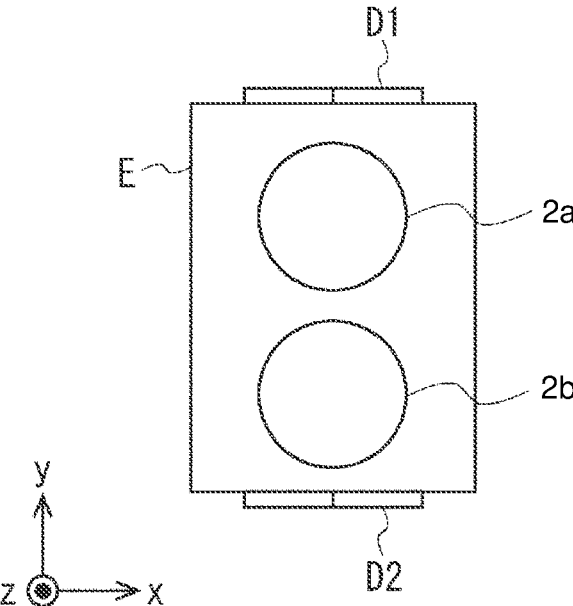
FIG. 6 is a schematic diagram illustrating a configuration of a mobile body according to a second embodiment.

FIG. 6 is a schematic diagram illustrating a configuration of a mobile body according to a second embodiment. More specifically, FIG. 6 is a schematic plan view of a mobile body 2a and a mobile body 2b riding on an elevator car E. As shown in FIG. 6, the elevator car E according to the present embodiment includes a door D1 and a door D2. The mobile body 2a and the mobile body 2b can get on and off using either the door D1 or the door D2. However, when another mobile body 2 is present on a path along which the mobile body 2 is directed toward the door D1 or the door D2, the same path as in the first embodiment occurs.

In the present embodiment, in order to determine the occurrence of the passing, it is necessary to consider from which door the mobile body 2 gets on and off.

Therefore, in the present embodiment, the information regarding the entry source includes information indicating the rank of the entry source and identification information of the entry door. Further, the information on the destination includes information indicating the rank of the destination and identification information of the door to be descended.

Judgment Method

Next, with reference to the drawings, a method of determining whether or not the first and second mobile bodies are passed will be described in detail in the present embodiment.

In the present embodiment, as in the first embodiment, a graph is created on xy coordinates on the basis of the information on the entry source and the information on the destination, and it is determined whether or not the graph has an intersection point. Then, when the graph has an intersection point, it is determined that the mobile body 2 has passed.

In the present embodiment, when the mobile body 2 gets on from the door D1 and gets off from the door D1, a chart on xy co-ordinates represented by Equation 6 below is created.
Mathematical Formula 6)

$$y=k_1(x-a)(x-b)+m_1 \qquad \text{Equation 6}$$

However,
A is the number of floors from which the mobile body 2 gets in, b is the floor number of the destination of the mobile body 2,
$k_1$ is a negative real number,
$m_1$ is a real number.

Figure 7:
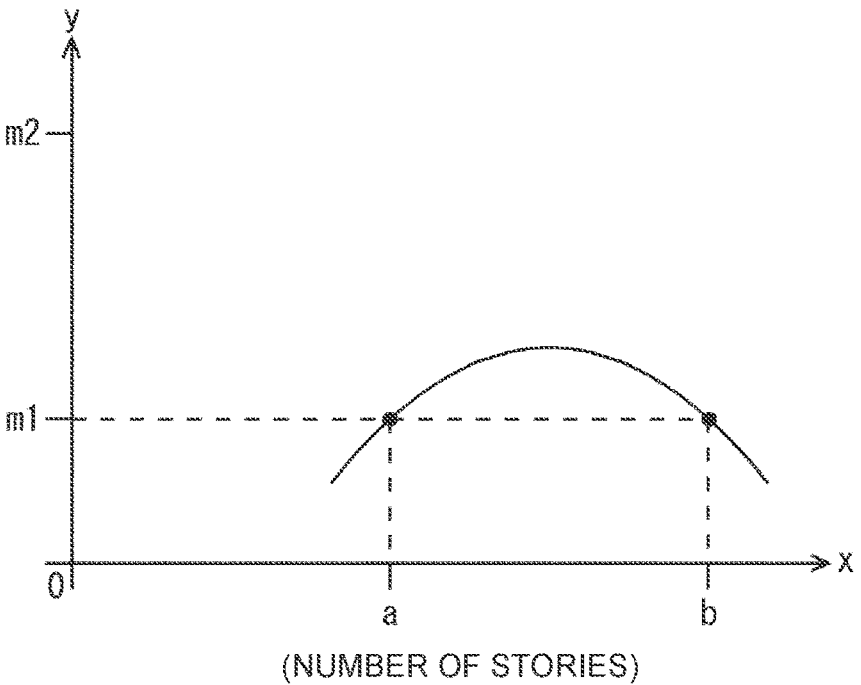
FIG. 7 is a diagram showing a graph on an xy coordinate represented by Equation 6.

FIG. 7 is a diagram showing a graph on xy coordinates represented by Equation 6. The graph represented by Equation 6 is represented as a graph of an upwardly convex quadratic function passing through points $(a, m_1)$ and $(b, m_1)$ on the x-axis as shown in FIG. 7.

Further, in the present embodiment, when the mobile body 2 gets on from the door D2 and gets off from the door D2, a chart on xy co-ordinates represented by Equation 7 below is created.
Mathematical Formula 7)

$$y=k_2(x-a)(x-b)+m_2 \qquad \text{Equation 7}$$

However,
A is the number of floors from which the mobile body 2 gets in,
b is the floor number of the destination of the mobile body 2,
$k_2$ is a positive real number,
$m_2$ is a real number greater than $m_1$.

Figure 8:
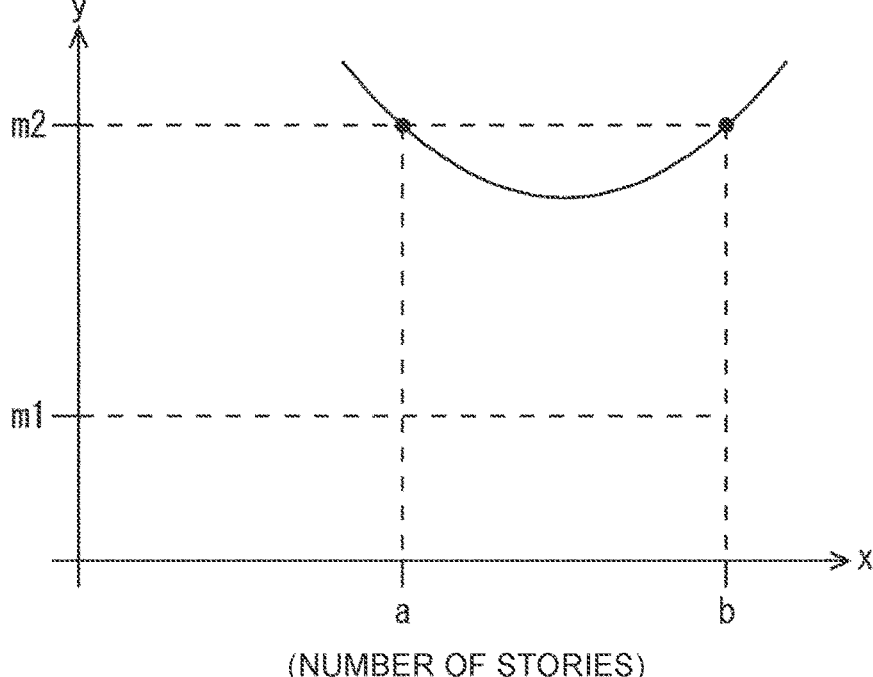
FIG. 8 is a diagram showing a graph on an xy coordinate represented by Equation 7.

FIG. 8 is a diagram showing a graph on xy coordinates represented by Equation 7. The graph represented by Equation 7 is represented as a graph of a downwardly convex quadratic function passing through points $(a, m_2)$ and $(b, m_2)$ on the x-axis as shown in FIG. 7.

In the present embodiment, $m_1 < m_2$, but $m_1 > m_2$ may be used. However, if $m_1 > m_2$, then $k_1$ is a positive real number and $k_2$ is a negative real number. In other words, Equations 6 and 7 can be collectively described as Equation 8 below.
Mathematical Formula 8)

$$y=k(x-c)(x-d)+m \qquad \text{Equation 8}$$

However,
c is the number of floors from which the mobile body 2 is loaded,
d is the rank of the destination of the mobile body 2.
When the mobile body 2 gets on and off the door D1, m is $m_1$,
When the mobile body 2 gets on and off the door D2, m is $m_2$,
If m is the larger of $m_1$ and $m_2$, then k is a positive real number,
If m is the smaller of $m_1$ and $m_2$, then k is a negative real number.

Further, when the door D used when the mobile body 2 gets into the elevator car E and the door D used when the mobile body 2 gets out of the elevator car E differ from each other, in the present embodiment, a graph on xy coordinates represented by Equation 1 below is created.

Equation 1

$$y = \frac{m_2 - m_1}{b-a}x + \frac{bm_1 - am_2}{b-a} \qquad (9)$$

Figure 9:
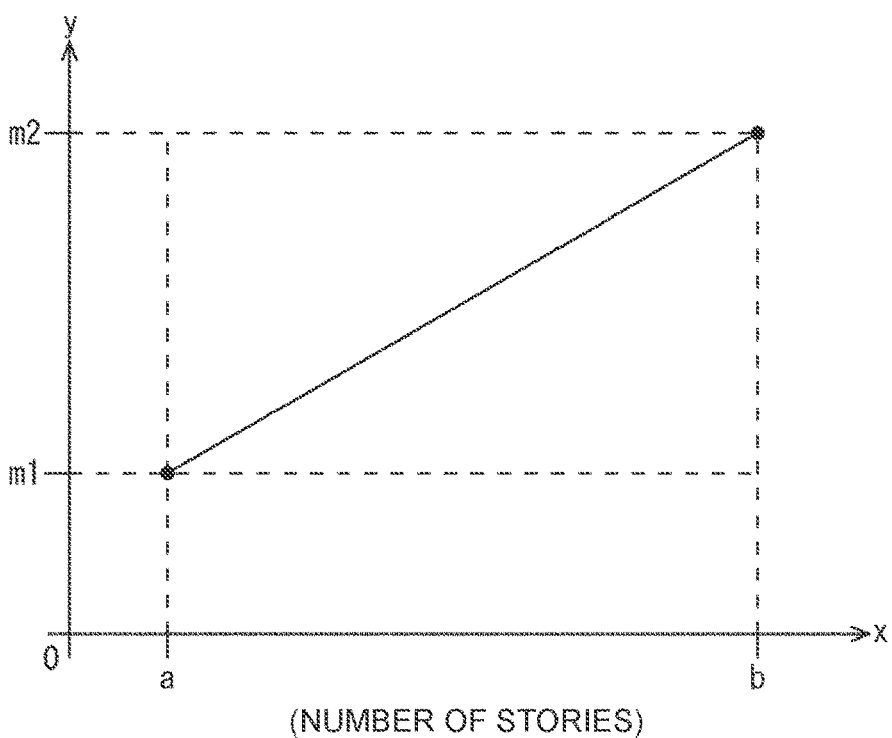
FIG. 9 is a diagram showing a graph on xy coordinates represented by Equation 1.

FIG. 9 is a diagram illustrating a graph on xy coordinates represented by Equation 1. The graph represented by Equation 1 is represented as a graph of a linear line passing through a point $(a, m_1)$ and $(b, m_2)$ on the x-axis as shown in FIG. 7.

Equation 1 below is described assuming that the mobile body 2 gets into the elevator car E from the door D1 and gets off the elevator car E from the door D2. When the mobile body 2 gets into the elevator car E from the door D2 and gets out of the elevator car E from the door D1, m2 and m1 are interchanged and described, a corresponding mathematical equation is obtained.

The determination unit 12 according to the present embodiment acquires information on the entry source of each of the mobile body 2a and the mobile body 2b and information on the destination, and creates a chart for each of the mobile bodies 2. Then, it is determined whether or not each graph has an intersection point.

Figure 10:
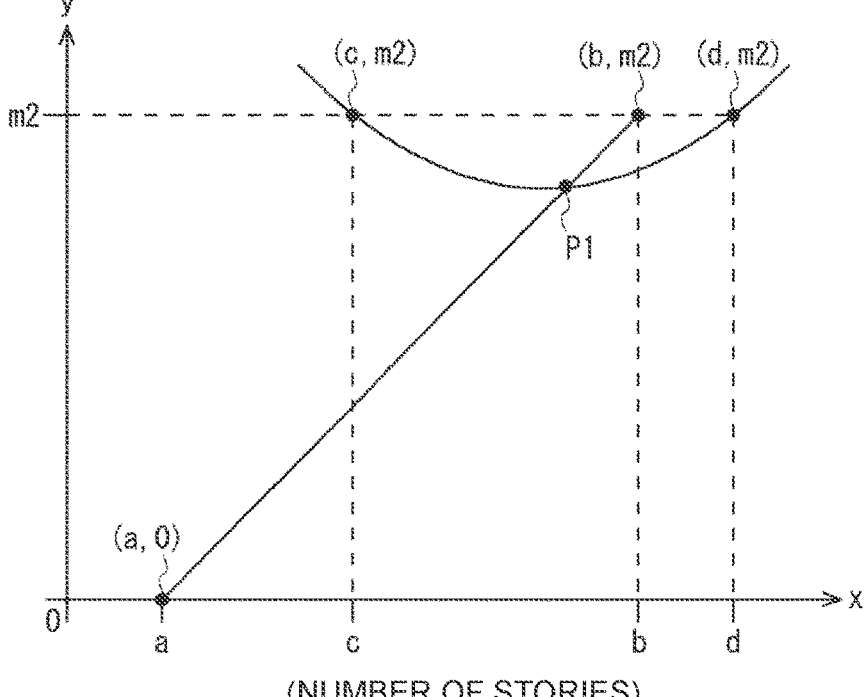
FIG. 10 is a diagram showing a graph on xy coordinates represented by Equations 1 and 2.

FIG. 10 is a graph of xy coordinates represented by Equation 1 and Equation 2.

More specifically, FIG. 10 is a diagram showing a graph in which the mobile body 2a gets on from the door D1 of the layer a and gets off from the door D2 of the layer b, and a graph in which the mobile body 2b gets on from the door D2 of the layer c and gets off from the door D2 of the layer d in a superimposed manner. However, for simplicity, $m_1 = 0$ is described.

Here, it is assumed that the mobile body 2a gets on from the door D1 of the hierarchy a, gets off from the door D2 of the hierarchy b, gets on the mobile body 2b from the door D2 of the hierarchy c, and gets off from the door D2 of the hierarchy d. The condition under which a pass occurs between the mobile body 2a and the mobile body 2b is c<b<d when the elevator car E is raised, and c>b>d when the elevator car E is lowered.

When c<b<d or c>b>d holds, as shown in FIG. 10, the two graphs have an intersection P1. Therefore, the determination unit 12 determines that the mobile body 2a and the mobile body 2b pass each other when the two graphs have intersections.

Figure 11:
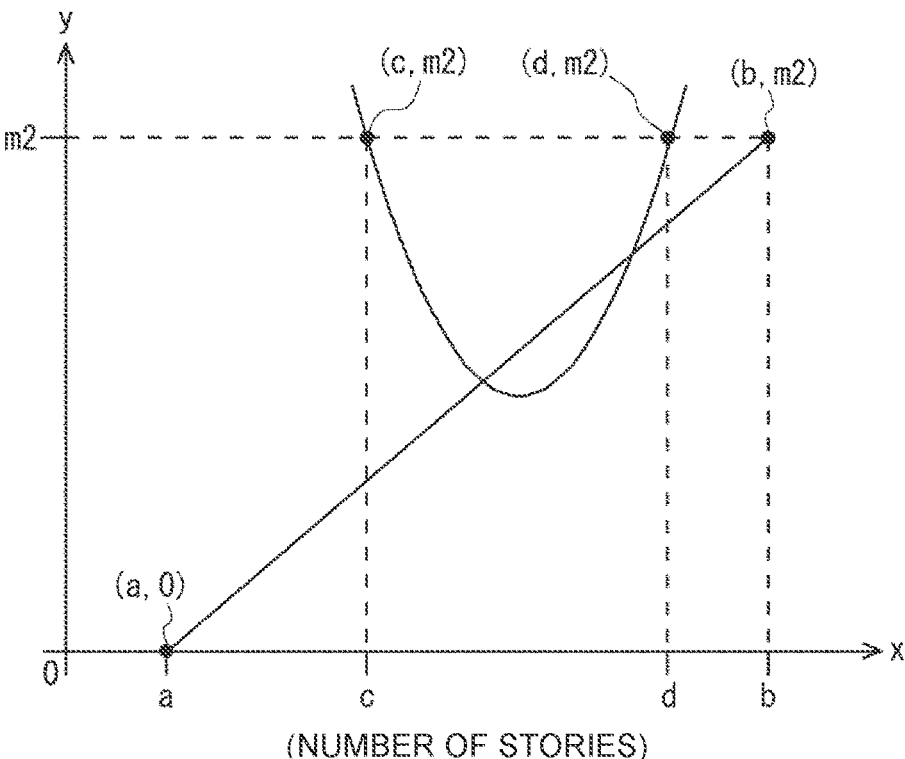
FIG. 11 is a diagram illustrating a graph on xy coordinates represented by Equation 1 and Equation 2.

However, even when the two graphs have intersections, c<b<d or c>b>d may not hold as shown in FIG. 11. In such a case, it can be eliminated by limiting the range of the real number k. k may satisfy the following Equation 3.

Equation 3

$$|k(c-d)| < \frac{|m_2 - m_1|}{f-1} \tag{10}$$

However, f is the total number of floors on which the elevator car E can move.

Note that the left side of Equation 3 indicates the slope at the point of x=c or x=d of the plot corresponding to the path of the mobile body 2b. The right side of Equation 3 indicates the slope of the graph having the largest slope among the graphs corresponding to the path of the mobile body 2a.

If the slope at the point of x=c or x=d of the graph corresponding to the path of the mobile body 2b is smaller than the slope of the graph having the largest slope among the graphs corresponding to the path of the mobile body 2a, there is no intersection as shown in FIG. 11.

Therefore, when k satisfies Equation 3 and the two graphs have intersections, a misalignment occurs between the mobile body 2a and the mobile body 2b.

As described above, the mobile body control system according to the present embodiment determines whether or not a plurality of mobile bodies on an elevator car having a plurality of doors pass each other.

Further, in the mobile body control system according to the present embodiment, the information regarding the entry source includes information indicating the number of floors of the entry source and identification information of the entry door. Further, the information on the destination includes information indicating the rank of the destination and identification information of the door to be descended. Further, a graph corresponding to each route of the mobile body is created based on these pieces of information, and when the graph has an intersection point, it is determined that the mobile body passes.

According to such a configuration, even when the elevator car uses a plurality of doors, it is possible to appropriately determine whether or not the mobile body passes.

Although the present disclosure has been described with reference to the above embodiments, it is to be understood that the disclosure is not limited only to the configuration of the above embodiments, but also includes various modifications, modifications, and combinations that may be made by a person skilled in the art within the scope of the claimed disclosure of the claims of the present application.

What is claimed is:

1. A mobile body control system comprising:

an acquisition unit that acquires information on an entry source and information on a destination of a first mobile body and a second mobile body entering an elevator car having a plurality of doors; and a determination unit that determines whether the first mobile body and the second mobile body pass each other, based on the information on the entry source and the information on the destination of the mobile bodies, the information on the entry source includes information indicating a floor number of the entry source and identification information of an entry door, and the information on the destination includes information indicating a floor number of the destination and identification information of an exit door, and whether the first mobile body entering from a first door and exiting from a second door and the second mobile body entering and exiting from only one of the first and the second doors pass each other, when the determination unit determines that the first mobile body entering from the first door and exiting from the second door and the second mobile body entering and exiting from only one of the first and the second doors pass each other, the determination unit determines whether a first graph on xy coordinates represented by Equation 1 below and a second graph on xy coordinates represented by Equation 2 below have an intersection point, and when the first graph and the second graph have the intersection point, the determination unit determines that the first mobile body and the second mobile body pass each other, Equation 1

$$y = \frac{m_2 - m_1}{b-a}x + \frac{bm_1 - am_2}{b-a} \qquad \text{Equation 1}$$

Equation 2

$$y = k(x-c)(x-d) + m \qquad \text{Equation 2}$$

wherein, a is a floor number of an entry source of the first mobile body, b is a floor number of a destination of the first mobile body, c is a floor number of an entry source of the second mobile body, d is a floor number of a destination of the second mobile body, $m_1$ and $m_2$ are different real numbers, when the second mobile body enters and exits from the first door, m is $m_1$, when the second mobile body enters and exits from the second door, m is $m_2$, when m is a larger one of $m_1$ and $m_2$, k is a positive real number, when m is a smaller one of $m_1$ and $m_2$, k is a negative real number, k satisfies the following Equation 3, and Equation 3

$$|k(c-d)| < \frac{|m_2 - m_1|}{f-1} \qquad \text{Equation 3}$$

f is a total number of floors on which the elevator car is able to move, wherein when the determination unit determines that the first mobile body and the second mobile body pass each other, a control unit of at least one of the first mobile body and the second mobile body changes an operation plan.

2. The mobile body control system according to claim 1, wherein when the determination unit determines that the first mobile body and the second mobile body pass each other, at least one of the mobile bodies determined to pass each other waits for entering the elevator car.

3. The mobile body control system according to claim 1, wherein when the determination unit determines that the first mobile body and the second mobile body pass each other, at least one of the mobile bodies determined to pass each other cancels entering the elevator car.

4. A mobile body control method comprising:

acquiring information on an entry source and information on a destination of first and second mobile bodies entering an elevator car having a plurality of doors;

determining whether the first mobile body and the second mobile body pass each other, based on the information on the entry source and the information on the destination of the mobile bodies, the information on the entry source includes information indicating a floor number of the entry source and identification information of an entry door, and the information on the destination includes information indicating a floor number of the destination and identification information of an exit door;

determining whether the first mobile body is entering from a first door and exiting from a second door and the second mobile body is entering and exiting from only one of the first and the second doors pass each other;

when the determination is that the first mobile body is entering from the first door and exiting from the second door and the second mobile body is entering and exiting from only one of the first and the second doors pass each other, determining whether a first graph on xy coordinates represented by Equation 1 below and a second graph on xy coordinates represented by Equation 2 below have an intersection point, and when the first graph and the second graph have the intersection point, determining that the first mobile body and the second mobile body pass each other, Equation 1

$$y = m_2 - m_1/b - ax + bm_1 - am_2/b - a \qquad \text{Equation 1}$$

Equation 2

$$y = k(x-c)(x-d) + m \qquad \text{Equation 2}$$

wherein, a is a floor number of an entry source of the first mobile body, b is a floor number of a destination of the first mobile body, c is a floor number of an entry source of the second mobile body, d is a floor number of a destination of the second mobile body, $m_1$ and $m_2$ are different real numbers, when the second mobile body enters and exits from the first door, m is $m_1$, when the second mobile body enters and exits from the second door, m is $m_2$, when m is a larger one of $m_1$ and $m_2$, k is a positive real number, when m is a smaller one of $m_1$ and $m_2$, k is a negative real number, k satisfies the following Equation 3, and Equation 3

$$|k(c-d)| < |m_2 - m_1|/f - 1 \qquad \text{Equation 3}$$

f is a total number of floors on which the elevator car is able to move; and changing, via a control unit of the first mobile body or the second mobile body, an operation plan of at least one of the first mobile body and the second mobile body when the first mobile body and the second mobile body are determined to pass each other.

5. A non-transitory storage medium storing instructions that are executable by one or more processors and that cause the one or more processors to execute functions comprising:

acquiring information on an entry source and information on a destination of first and second mobile bodies entering an elevator car having a plurality of doors;

determining whether the first mobile body and the second mobile body pass each other, based on the information on the entry source and the information on the destination of the mobile bodies, the information on the entry source includes information indicating a floor number of the entry source and identification information of an entry door, and the information on the destination includes information indicating a floor number of the destination and identification information of an exit door;

determining whether the first mobile body is entering from a first door and exiting from a second door and the second mobile body is entering and exiting from only one of the first and the second doors pass each other;

when the determination is that the first mobile body is entering from the first door and exiting from the second door and the second mobile body is entering and exiting from only one of the first and the second doors pass each other, determining whether a first graph on xy coordinates represented by Equation 1 below and a second graph on xy coordinates represented by Equation 2 below have an intersection point, and when the first graph and the second graph have the intersection point, determining that the first mobile body and the second mobile body pass each other, Equation 1

$$y = m_2 - m_1/b - ax + bm_1 - am_2/b - a \qquad \text{Equation 1}$$

Equation 2

$$y = k(x-c)(x-d) + m \qquad \text{Equation 2}$$

wherein, a is a floor number of an entry source of the first mobile body, b is a floor number of a destination of the first mobile body, c is a floor number of an entry source of the second mobile body, d is a floor number of a destination of the second mobile body, $m_1$ and $m_2$ are different real numbers, when the second mobile body enters and exits from the first door, m is $m_1$, when the second mobile body enters and exits from the second door, m is $m_2$, when m is a larger one of $m_1$ and $m_2$, k is a positive real number, when m is a smaller one of $m_1$ and $m_2$, k is a negative real number, k satisfies the following Equation 3, and Equation 3

$$|k(c-d)| < |m_2 - m_1|/f - 1 \qquad \text{Equation 3}$$

f is a total number of floors on which the elevator car is able to move; and changing, via a control unit of the first mobile body or the second mobile body, an operation plan of at least one of the first mobile body and the second mobile body when the first and second mobile bodies are determined to pass each other.

\* \* \* \* \*